A. ROESCH.
CONTROLLING APPARATUS.
APPLICATION FILED DEC 18, 1919.
1,430,852.
Patented Oct. 3, 1922.
2 SHEETS—SHEET 1.
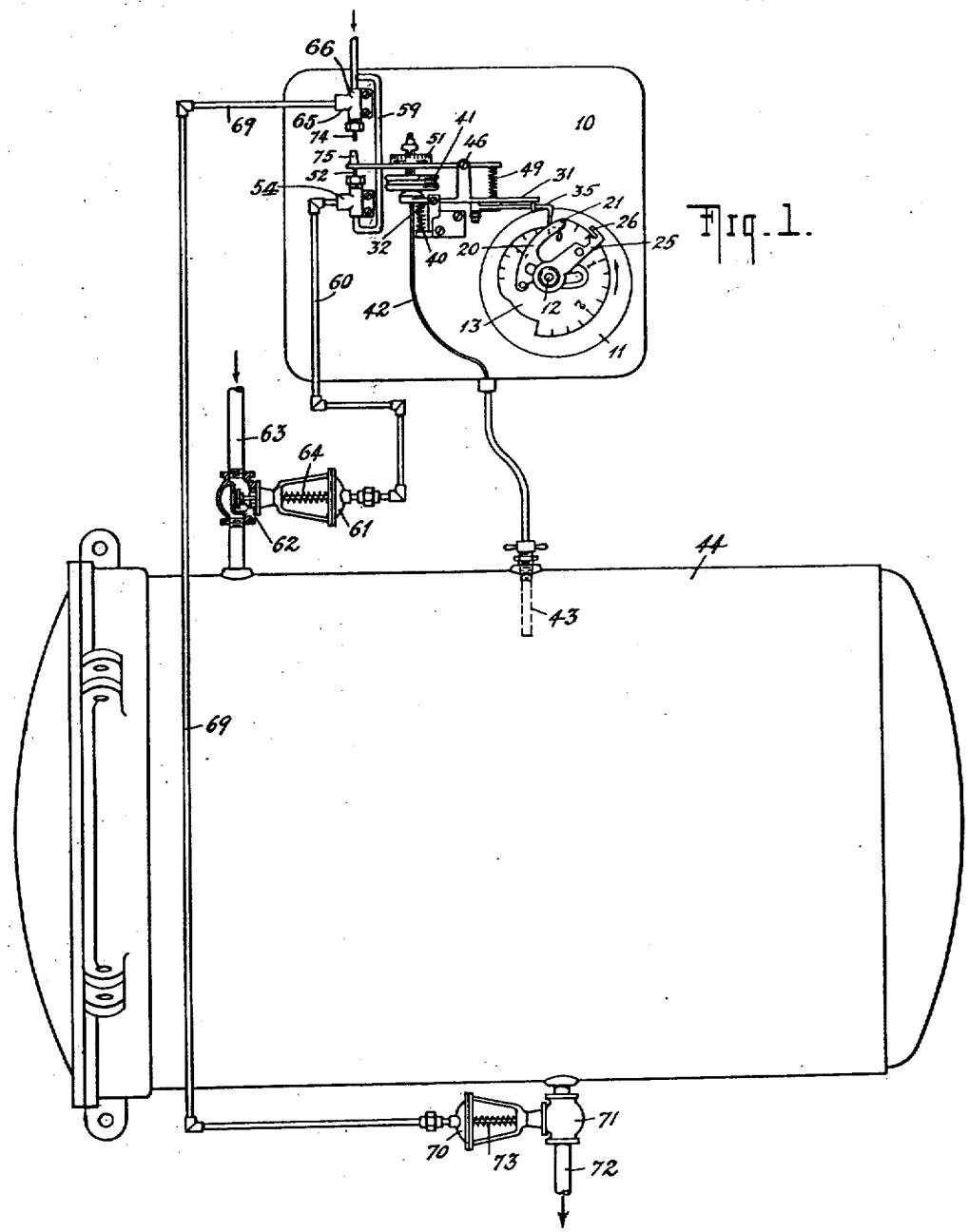
WITNESSES
INVENTOR
Alfred Roesch
BY
ATTORNEYS

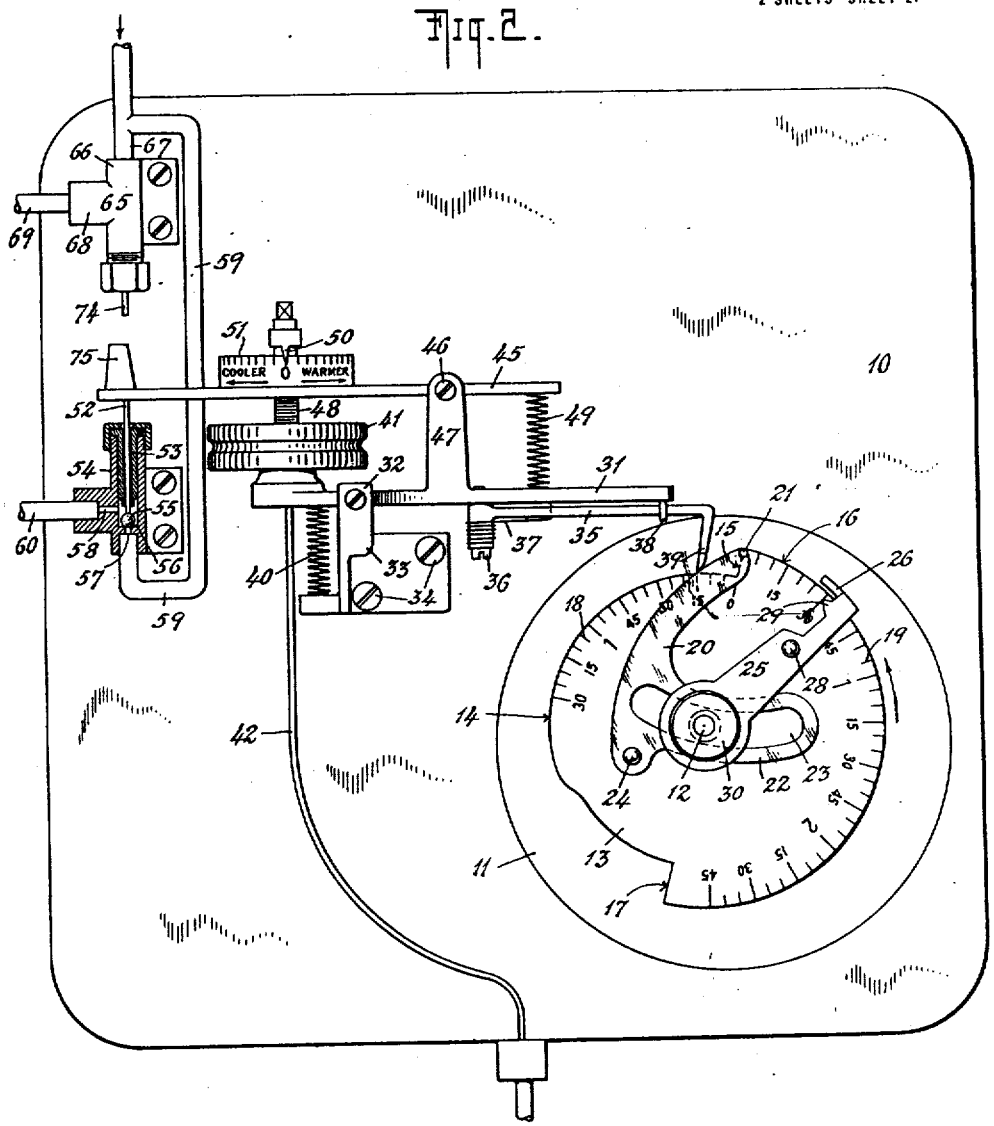
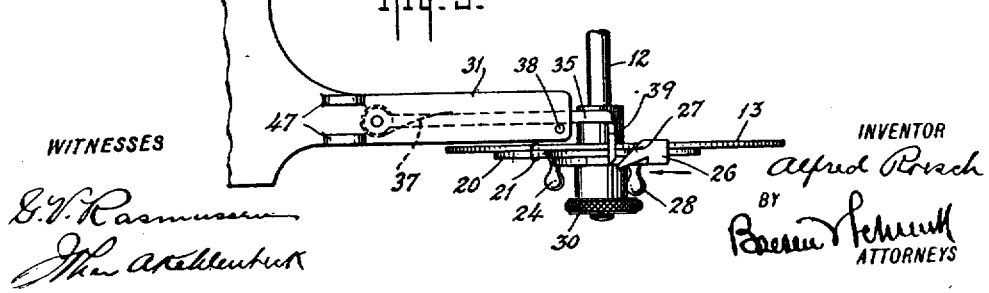

Patented Oct. 3, 1922.

1,430,852

UNITED STATES PATENT OFFICE.

ALFRED ROESCH, OF BROOKLYN, NEW YORK, ASSIGNOR TO CHARLES J. TAGLIABUE MANUFACTURING CO., OF BROOKLYN, NEW YORK, A CORPORATION OF NEW YORK.

CONTROLLING APPARATUS.

Application filed December 18, 1919. Serial No. 345,918.

*To all whom it may concern:*

Be it known that I, ALFRED ROESCH, a citizen of the United States, and resident of the borough of Brooklyn, county of Kings, city and State of New York, have invented certain new and useful Improvements in a Controlling Apparatus, of which the following is a specification.

My invention relates to automatic controlling apparatus and more particularly to that type thereof whereby predetermined conditions of temperature, pressure, etc., are automatically produced within a given period of time. The field of use of the apparatus is very extensive; to facilitate the understanding thereof and without intending to define the limits of the invention, it is illustrated and described in connection with a vulcanizer. In carrying out the process of vulcanization under certain conditions it is necessary that the temperature in the vulcanizer shall be progressively increased for a predetermined period of time and then maintained at a given point for another predetermined period of time, after which the heat producing medium may be completely shut off. For instance, in curing rubber of different compositions and of different thickness for various kinds of goods, different temperatures and different periods of time, both for the rising and holding temperatures are required so that a flexibility of adjustment is necessary in order to provide an efficient apparatus.

The object of my invention is to provide a simplified apparatus whereby the above results are obtained in a novel manner and whereby interchanging of parts to effect a change in adjustment is practically eliminated. Other more specific objects will appear from the description hereinafter and the features of novelty will be pointed out in the appended claims.

In the accompanying drawings, which, for convenience of description, show an example of the invention in connection with a vulcanizer, Figure 1 is a diagrammatic elevation of the apparatus; Fig. 2 is a detail elevation on an enlarged scale, of the controlling apparatus itself; and Fig. 3 is a fragmentary plan view.

In its illustrated form the controlling apparatus comprises a support 10 which may be in the nature of a base or board upon which a conventional clock-work 11 is secured in any convenient manner, the spindle 12 of said clock-work carrying a cam 13 of predetermined form and dimensions. In the example shown, the cam 13 is constructed to perform its functions in a maximum period of four and one-half hours and comprises a peripheral segmental section 14 connected by a radial section 15 with a peripheral segmental section 16 of relatively greater radius and which terminates at an inwardly extending radial section 17 as shown in the drawings, the remaining periphery of the cam being of reduced radius and of any suitable shape. Scales 18 and 19 comprising indications designating five minute periods are located adjacent to the peripheral sections 14 and 16, those indications which designate hours and quarter hours being indicated by the proper figure designations. The cam 13 includes further a member 20 constructed preferably of celluloid or other suitable transparent material which constitutes a means whereby the effective peripheral or other contour of the cam is changed at will and is adjustably mounted upon said cam by being pivoted at 21 in the angle formed by the radial section 15 and peripheral section 16; this member 20 extends in surface engagement with said cam 13 toward the peripheral section 14 and is formed with an integral continuation 22 provided with a closed slot 23 curved about the pivot 21 and extending over the clock spindle 12. To facilitate the actuation of said member 20 for adjustment purposes an operating handle 24 or its equivalent may be provided at a suitable point as shown in Figs. 2 and 3. The member 20 is adjusted relatively to the indications 18 and by its adjustment predetermines the period of time during which a progressive increase of temperature is brought about as will be more fully set forth hereinafter. In addition to the above the cam includes an arm 25 which is rotatably mounted upon the spindle 12 in surface engagement with the continuation 22 and extends radially outward to the periphery of the segmental section 16 of said cam. The free end of said arm 25 is bent transversely to the major portion thereof so as to form a cut-off flange 26 which overlies the segmental section 16 and is formed with an inclined end surface 27 as shown in Fig. 3. A manipulating handle or knob 28 is located upon the arm 25 at a suitable point for facilitating the adjustment thereof while an integral projection in the form of a pointer 29 extends from said arm into cooperative relation with the indications of the scale 19 to visibly indicate the adjustment or specifically, in the illustrated example, the predetermined period of time during which the temperature is to be maintained at an approximately fixed point. Any convenient and well-known means may be provided for fixing the member 20 and the arm 25 in their adjusted positions; for instance as shown the outer end of the clock-spindle 12 may be screw-threaded for the accommodation of a preferably knurled nut 30 which by being screwed up against the arm 25, serves to clamp the latter and the member 20 between itself and the cam 13 against movement relatively to each other and to said cam. The member 20 and the arm 25 or their equivalents constitute devices, in whatever form they may be constructed and with whatever type of cam they may be combined, whereby the operating characteristics of said cam may be varied at will.

It will be understood that the cam 13 may be of varied construction so far as the range of progressive increases in temperature and the range of sustained temperatures is concerned. Thus in the illustrated example the adjustment whereby increases of temperature periods are controlled ranges from five minutes to one and one half hours as indicated by the scale 18 while the adjustment controlling the substantially fixed temperature periods extends over three hours as indicated by the scale 19. The periods of time during which the results sought for are predetermined are governed by the adjustments of the member 20 and arm 25.

Furthermore the peripheral sections 14 and 16 are arranged in accordance with the particular process for which the particular cam 13 is intended. Thus in a process in which the effective temperature range begins at 212° F. and gradually rises to and is sustained at 300° F. the section 14 will represent 212° F. and the section 16 will represent 300° F. while the intermediate degrees between these two limits are represented by the active edge of the member 20.

The mechanism which co-acts with the cam 13 and its parts to produce the desired time and temperature control may be of varied form suitable for the intended purposes. In the illustrated example said mechanism includes a main lever 31 fulcrumed at 32 upon a bracket 33 which may be secured to the support 10 in any convenient manner as by means of screws 34. A cam-lever 35 is pivotally mounted upon the main lever 31 to move about an axis 36 which is transverse to the fulcrum 32, said cam-lever 35, by means of a spring 37, being normally maintained in contact with a pin 38 located also on said main lever 31. At its outer end the cam-lever 35 is provided with a transverse member 39 which excepting as hereinafter set forth, is maintained in engagement with the periphery of the cam 13 by means of a spring 40 extending between opposed portions of the lever 31 and bracket 33 as shown in Fig. 2. The main lever 31 carries also a capsular spring 41 of conventional construction or its equivalent, which capsular spring is connected by means of a fine capillary tube 42 with a thermostatic bulb 43 containing a volatile fluid in the well-known way. The thermostatic bulb 43 or its equivalent constitutes a sensitive member which is located within the zone where the conditions of temperature, pressure, etc. are to be controlled; in the illustrated example the bulb 43 is connected with and extends into a vulcanizer 44 which may be of any existing type.

The main-lever 31 carries further an auxiliary lever 45 which is pivotally mounted at 46 upon lugs 47 located at proper points upon said main-lever 31. The auxiliary lever 45 extends across and beyond the capsular spring 41 or its equivalent and is provided with an adjustable screw 48 which is maintained in contact with the capsular spring 41 by means of a spring 49 extending between the levers 31 and 45 as illustrated in Fig. 2. To facilitate the adjustment the screw 48 may be provided with an indicating pointer 50 co-operating with scales produced upon a scale-member 51 fixed upon said auxiliary lever 45. The latter projects over a valve stem 52 fitted loosely within an exhaust passage 53 of a valve casing 54 and having its inner end in contact with or secured to a ball-valve 55 located in a chamber 56 of said casing 54 and communicating with the passage 53 thereof. The valve casing in the example shown is mounted upon the support 10 and is further constructed with an inlet port 57 and with an outlet port 58 both of which communicate with the chamber 56, the inlet port 57 being connected by means of a pipe 59 with a source of compressed air and the outlet port 58 being connected by means of a pipe 60 with the diaphragm chamber 61 of a diaphragm motor valve 62 located in the inlet pipe 63 whereby steam or other heating medium is conducted to the vulcanizer 44. The diaphragm valve may be of any ordinary construction and is maintained in and returned to an open position by means of a spring 64 and is closed by the action of the air pressure upon the diaphragm in the diaphragm chamber 61 in the well-known manner.

A second valve casing 65, which may be a duplicate in all respects of the valve casing 54, is secured upon the support 10 and has its inlet port 66 connected by means of a connection 67 with the previously mentioned source of compressed air and its outlet port 68 connected by means of a pipe 69 with the diaphragm chamber 70 of a blow-off valve 71 located in a blow-off pipe 72 which communicates with the vulcanizer 44. The valve 71 may be a duplicate of the valve 62 and may similarly be maintained in and returned to its open position by means of a spring 73, and closed by means of the air pressure upon the diaphragm in the chamber 70. A ball valve, similar to the valve 55, and likewise located in a chamber, engages or is secured to the end of a valve stem 74 which is fitted loosely in the exhaust passage of the casing 65 and projects beyond the same into proximity to a projection 75 carried by the auxiliary lever 45, the projection 75 being normally spaced from the stem 74 as shown in Fig. 2.

In operation, the member 20 and arm 25 of the cam 13 are set in accordance with the predetermined periods of time during which a progressive increase of temperature and a fixed temperature are respectively desired and secured in their adjusted positions by means of the nut 30. For instance, as shown in the illustrated example the outer edge of the member 20 bisects the peripheral portion 14 of the cam 13 at the indication fifteen of the scale 18, while the pointer 29 of the arm 25 is in registry with the indication thirty of the scale 19 thus indicating that a progressive increase of temperature in the vulcanizer 44 will be had for fifteen minutes after which the temperature will be held stationary for a period of thirty minutes. By adjusting the member 20 and arm 25 to different points along the scales 18 and 19, any predetermined result may be similarly attained; the adjustment of the member 20 is facilitated because of its transparency which makes the scale 18 visible to the operator at all times. After the desired adjustment of the member 20 and arm 25 has been effected, the cam 13 is rotatably adjusted to bring the angle formed by the peripheral portion 14 and the outer edge of the member 20 into registry with the end of the transverse member 39 of the cam-lever 35, said transverse member being in engagement with the cam at this point as shown in Fig. 2. With the parts in this position the valve stem 74 of the valve is free from restraint, so that the air pressure will force the ball-valve of the casing 65 against the end of the exhaust passage thereof to close the same and will pass through the chamber of said casing 65 and pipe 69 to the diaphragm chamber 70 and thus maintain the blow-off valve 71 in its closed position against the tension of its spring 73.

Because of the engagement of the transverse member 39 with the peripheral section 14 of the cam 13 the auxiliary lever 45 exerts a pressure upon the valve stem 52 and thereby forces the valve 55 into the position shown in Fig. 2 in which the exhaust passage 53 is open and as a result the steam valve 62 is also open under the influence of its spring 64. The supply of steam is now turned on, for instance by manually opening a controlling valve, and passes by the open steam valve 62 into the vulcanizer 14 in which the temperature accordingly begins to rise. As soon as said temperature reaches 212° F., the point represented in the present instance by the cam section 14, and to which the screw 48 is set, the capsular spring 41 is expanded somewhat and accordingly exerts a pressure against said adjusting screw 48 and moves the auxiliary lever 45 on its pivot 46. Because of the fact that the capsular spring 41 and the auxiliary lever 45 are both carried by the main lever 31 the described swinging movement of said auxiliary lever 45 is relative to the main lever and in a direction to compress the spring 49 and move the one end of said auxiliary lever 45 away from the valve stem 52. The latter being thereby relieved from restraint, the air pressure immediately forces the ball valve 55 against the inner end of the exhaust passage 53 to close the same and to establish communication between the ports 57 and 58 by way of the chamber 56. As soon as this happens, air under pressure passes into the pipe 60 and to the diaphragm chamber 61 and by acting upon the diaphragm therein moves the valve 62 toward its closed position and thus decreases the supply of steam to the vulcanizer.

In the meantime as the cam 13 is rotating in the direction of the arrow in Figs. 1 and 2 through the medium of the clockwork 11, the transverse member 39 begins to ride or climb up on the inclined outer edge of the member 20 and thereby moves the cam lever 35 and main lever 31 on the fulcrum 32 against the tension of the spring 40. Because of the fact that the auxiliary lever 45 is pivoted upon the lugs 47 which form a part of the main lever 31 and because of the location of the spring 49 between the two levers 31 and 45, the auxiliary lever 45 partakes of the described pivotal movement of said main lever 31 and thus exerts a pressure upon the valve stem 52 in the direction of its length. This causes a lengthwise movement of said stem 52 in the passage 53 which forces the ball valve 55 away from the end of said passage 53 so that the supply of air pressure to the chamber 56 is reduced and the outlet port 58 is brought into communication with the exhaust passage 53 through the chamber 56. The air pressure previously existing upon the diaphram in the diaphragm chamber 61 is thus reduced with the result that the valve 62 is opened somewhat under the influence of its spring 64 whereby an increased supply of steam or its equivalent is admitted to the vulcanizer 44. This causes an increase of temperature in the latter which acts immediately upon the thermostatic bulb 43 and thereby brings about a further expansion of the capsular spring 41 which as a result again exerts a pressure against the adjusting screw 48 and again moves the auxiliary lever 45 on its pivot 46 away from the valve stem 52. The latter being thereby again relieved from restraint, the air pressure immediately forces the ball valve 55 against the inner end of the exhaust passage 53 to close the same and to reestablish communication between the ports 57 and 58 by way of the chamber 56. As soon as this happens, air under pressure passes into the pipe 60 and to the diaphragm chamber 61 and by acting upon the diaphragm therein again moves the valve 62 toward its closed position and again decreases the supply of steam to the vulcanizer.

This alternate actuation of the combined levers 31 and 45 and of the lever 45 relatively to the lever 31 continues as long as the transverse member 39 continues to ride along the inclined surface of the member 20, the valve 62 being correspondingly operated to alternately increase and decrease the supply of steam to the vulcanizer 14. The temperature thus continues to rise in progressive steps in said vulcanizer during the fifteen minutes it takes for the transverse member 39 to traverse the inclined surface of the member 20 when set as in the illustrated example.

It will be understood that the capsular spring 41 is expanded each time just far enough to check the temperature in the vulcanizer 14 from going materially beyond the degree corresponding to the point on the member 20 at which the transverse member 39 happens to be located. In other words the action of the capsular spring upon the auxiliary lever 45 checks any tendency of the cam 13 to open the steam valve too far.

When the transverse member 39 finally at the end of fifteen minutes reaches the peripheral portion 16 of the cam 13, a temperature corresponding to that represented by said portion 16 will have been reached in the vulcanizer 14, this temperature in the illustrated example being 300° F. and the capsular spring 41 will be expanded to an extent corresponding to this degree. Because of the fact that the portion 16 is an arc concentric to the axis of the cam 13, the main lever 31 will remain substantially inactive during the time that the transverse member 39 remains upon said cam section 16, whereby the temperature in the vulcanizer is sustained at 300° F. Should said temperature drop materially below this point, the capsular spring 41 will contract accordingly and thereby will permit the auxiliary lever 45, under the influence of the spring 49 to actuate the valve 55 and in consequence the steam valve 62 in a manner to permit sufficient additional steam to enter the vulcanizer 14 to again bring the temperature therein up to 300° F. When this condition is reached the capsular spring 41 is again expanded to pivotally move the auxiliary lever 45 whereby the cooperating parts are operated in a manner tending to close the steam valve 62 so that the temperature in said vulcanizer 14 is again maintained at 300° F. When the transverse member 39 reaches the surface 27 it will be swung upon its pivot 36 transversely to the main lever 31 and against the tension of the spring 37 by the camming action of said surface 27 as the cam 13 continues to rotate. The transverse member 39 will thereby finally be forced from the peripheral portion 16 of the cam 13, this step taking place in the illustrated example at the end of thirty minutes. As soon as the transverse member 39 has been thus forced laterally from the cam 13, the resistance to the action of the spring 40 which exists as long as the member 39 rides upon any part of the periphery of the cam 13, is removed. Under the action of said spring 40 at this stage the transverse member 39 drops or moves along side of the cam 13 and the main lever 31 is swung on its fulcrum 32 and carries with it the auxiliary lever 45 and connected parts and the capsular spring 41, it being understood that the capillary tube 42 is sufficiently flexible to permit this operation. The auxiliary lever 45 is thereby moved away from the valve stem 52, which being thus relieved of restraint permits the ball valve 55 to be moved against the end of the exhaust passage 53 to close the same and the diaphragm in the diaphragm chamber 61 to be acted upon by the air pressure whereby the valve 62 is closed and the supply of steam or its equivalent to the vulcanizer 44 cut off. The movement of the auxiliary lever 45 away from the stem 52 is sufficient to bring the projection 75 into engagement with the valve stem 74 and to exert a pressure thereon whereby said stem is moved lengthwise of the exhaust passage of the valve casing 65. This movement of said stem 74 is communicated to the co-operating ball valve which as a result is moved away from the inner end of said exhaust passage and against the inlet port 66 so that the compressed air is cut off and pressure upon the diaphragm in the diaphragm chamber 70 is relieved, thus permitting the blow off valve 71 to open under the action of the spring 73. The steam or its equivalent which has previously reached the vulcanizer 44 is thus quickly blown off through the pipe 72.

The particular operation having been finished, the apparatus may be reset, it being understood that the member 20 and arm 25 may remain in their adjusted positions if the operation is to be repeated or otherwise set if different results are desired. As the cam 13 is manually rotated to bring it back to the starting position, the cam lever 35 under the influence of the spring 37 will be swung on its pivot 36 back into contact with the pin 38 as soon as the radial portion 17 of the cam 13 has passed the transverse member 39. In other words, after having been forced from the periphery of the cam 13 as described, the transverse member 39 is pressed against the surface of the cam 13 by the action of said spring 37, so that the moment the radial portion 17 has passed said transverse member 39, the latter will be automatically returned to the periphery of said cam, movement transversely beyond the same by the spring 37 being prevented by the pin 38. It will be understood that the transverse member 39 in its inward movement, after having been forced from the periphery of the cam by the inclined surface 27, does not pass inwardly beyond that portion of the cam's periphery which connects with the inner end of the radial portion 17 so that the automatic return of the transverse member to its operative position in said cam is not interfered with.

The apparatus is simple in construction and efficient in operation and provides a means whereby predetermined time and temperature control is automatically secured in a reliable manner. The provision of the adjustable cam provides a wide range of adjustment in the apparatus and obviates the necessity for a substitution of elements or, specifically of different cams, each time a different time and temperature combination is desired.

It will be understood that the illustration and description of the apparatus in connection with a vulcanizer for controlling the admission of a heating medium thereto is not to be taken as defining the limits of the invention as the latter may be efficiently used in many other ways and for controlling media other than steam or its equivalent.

Various changes in the specific form shown and described may be made within the scope of the claims without departing from the spirit of my invention.

I claim:

1. The combination of an element in which the temperature is to be controlled, a conduit for conducting a medium to said element whereby the temperature therein is affected, means in said conduit whereby the flow of said medium is controlled, mechanism whereby the actuation of said controlling means is controlled in a predetermined manner for a given period of time, a member sensitive to temperature changes extending into said element and a co-operating device carried by said mechanism so as to partake of the movements thereof and connected with said member whereby said mechanism responds to temperature changes in said element.

2. The combination of an element in which the temperature is to be controlled, a conduit for admitting a heating medium to said element, a valve in said conduit whereby the flow of heating medium is controlled, a main lever, an auxiliary lever carried thereby, time controlled mechanism for operating said levers to control the actuation of said valve in a predetermined manner for a given period of time, a heat sensitive member extending into said element and a capsular spring carried by said main lever so as to partake of the movements thereof and connected with said member whereby said auxiliary lever is actuated in response to temperature changes in said element.

3. A controlling mechanism of the kind described comprising a valve, mechanism whereby the actuation of said valve is controlled, and means sensitive to temperature changes carried partly by said mechanism to partake of the movements thereof whereby said mechanism responds to said temperature changes.

4. A controlling mechanism of the kind described comprising a valve, a main lever, an auxiliary lever carried thereby, time controlled mechanism for actuating said levers in unison to control the actuation of said valve, a member sensitive to temperature changes and a co-operating device carried by one of said levers and partaking of the movements thereof whereby said auxiliary lever is actuated independently of said main lever in response to said temperature changes.

5. A controlling mechanism of the kind described comprising a valve, a main lever, an auxiliary lever carried thereby, a cam for actuating said levers in unison to control the actuation of said valve, said cam including adjustable devices whereby its operating characteristics are varied, a member sensitive to temperature changes, means for actuating said cam, and a capsular spring carried by said main lever so as to partake of the movements thereof and connected with said member whereby said auxiliary lever is actuated independently of said main lever in response to temperature changes.

6. A controlling mechanism of the kind described comprising a cam having peripheral portions of different radii, a member adjustably mounted upon said cam and connecting the two peripheral portions thereof, an arm adjustably mounted upon said cam and including an end surface inclined transversely across the peripheral portion of larger radius, means for securing said member and arm in their adjusted positions, time-controlled mechanism for operating said cam, a pivoted main lever, an auxiliary lever pivotally mounted on said main lever, a cam lever pivotally mounted on said main lever to swing about an axis transverse to that of the main lever and arranged to ride upon said member from one peripheral portion of the cam to the other peripheral portion thereof and to traverse the latter whereby said two levers are actuated in unison to control the actuation of said valve, said cam lever being forced transversely from the peripheral portion of said cam by the inclined end surface of said arm to remove the control of said levers from said valve, a member sensitive to temperature changes and a capsular spring carried by said main lever so as to move therewith and connected with said sensitive member whereby said auxiliary lever is actuated independently of said main lever in response to said temperature changes.

7. In a controlling apparatus, mechanism whereby the controlling function is performed, a cam whereby said mechanism is operated, means for actuating said cam and a device carried by said cam whereby said mechanism is disengaged from the active surface of said cam at a predetermined point in its rotation.

8. In a controlling apparatus, mechanism whereby the controlling function is performed, a cam whereby said mechanism is operated, means for actuating said cam, a member adjustably mounted upon said cam to provide an adjustable rise thereon and a device carried by said cam and adjustable thereon relatively to said member whereby said mechanism is disengaged from the active surface of said cam at a predetermined point in its rotation.

9. In a controlling apparatus, mechanism whereby the controlling function is performed, a cam whereby said mechanism is operated, means for actuating said cam, a member adjustably mounted upon said cam to provide an adjustable rise thereon, an arm carried by said cam and adjustable thereon relatively to said member, a cut-off flange located upon said arm and projecting transversely across and beyond the active surface of said cam whereby said mechanism is forced from said cam at a predetermined point in its rotation.

10. In a controlling mechanism of the kind described a cam having adjacent peripheral portions of different radii, scale indications along said peripheral portions designating periods of time and subdivisions thereof, a member pivotally connected with said cam at the beginning of the pheripheral portion of greater radius and intersecting the peripheral portion of lesser radius in co-operative relation to one of said scales, an arm pivotally movable about the axis of said cam, a flange on said arm projecting transversely across and beyond the peripheral portion of greater radius, a pointer co-operating with the other scale to indicate the adjustment of said arm and means for securing said member and arm in their adjusted positions.

11. In a controlling device, a cam, a member adjustably mounted on said cam to provide an adjustable rise thereon and a cut-off device carried by said cam and arranged to exert a camming action transverse to the active surface of said cam.

12. In a controlling device a cam, a member adjustably mounted on said cam to provide an adjustable rise thereon, an arm carried by said cam and adjustable thereon relatively to said member, a cut-off flange located on said arm and projecting transversely across and beyond the active surface of said cam and means whereby both said member and said arm are fixed in their adjusted positions.

In testimony whereof I have hereunto set my hand.

ALFRED ROESCH.